United States Patent [19]

McMurtry et al.

[11] Patent Number: 4,910,446
[45] Date of Patent: Mar. 20, 1990

[54] COORDINATE POSITIONING APPARATUS

[75] Inventors: David R. McMurtry; Nicholas A. James, both of Gloucestershire, United Kingdom

[73] Assignee: Renishaw plc, Gloucestershire, United Kingdom

[21] Appl. No.: 148,509

[22] PCT Filed: Jun. 15, 1987

[86] PCT No.: PCT/GB87/00416

§ 371 Date: Feb. 2, 1988

§ 102(e) Date: Feb. 2, 1988

[87] PCT Pub. No.: WO87/07711

PCT Pub. Date: Dec. 17, 1987

[30] Foreign Application Priority Data

Jun. 14, 1986 [GB] United Kingdom ................. 8614539

[51] Int. Cl.⁴ ........................... G01B 5/00; G12B 3/00; B23Q 11/00
[52] U.S. Cl. ..................................... 318/560; 318/605; 318/651; 33/1 M; 33/503
[58] Field of Search ............... 318/560, 687, 605, 661, 318/651; 33/1 M, 503, 504, 505, 556, 557, 558, 559, 560, 561

[56] References Cited

U.S. PATENT DOCUMENTS

| 3,322,379 | 5/1967 | Flannelly . | |
|---|---|---|---|
| 3,639,993 | 2/1972 | Sartorio . | |
| 3,686,556 | 8/1972 | Anger et al. | 318/605 X |
| 3,749,501 | 7/1973 | Wieg | 33/1 M X |
| 4,019,109 | 4/1977 | McCoy et al. | 318/687 X |
| 4,207,680 | 6/1980 | Bell et al. | 33/559 |
| 4,333,238 | 6/1982 | McMurty | 33/503 X |
| 4,420,886 | 12/1983 | Amano | 33/1 M |
| 4,507,868 | 4/1985 | Tuss . | |
| 4,520,569 | 6/1985 | Ireland | 33/561 X |
| 4,587,622 | 5/1986 | Herzog . | |
| 4,597,182 | 7/1986 | Rinn . | |
| 4,663,852 | 5/1987 | Guarini | 33/1 M |

FOREIGN PATENT DOCUMENTS

| 133585 | 1/1979 | Denmark . | |
|---|---|---|---|
| 1575423 | 10/1973 | Fed. Rep. of Germany . | |
| 2932888 | 2/1981 | Fed. Rep. of Germany . | |
| 58-90116 | 5/1983 | Japan | 33/1 M |
| 59-1833 | 1/1984 | Japan . | |
| 59-218902 | 12/1984 | Japan | 33/1 M |
| 7511872 | 6/1977 | Sweden . | |
| 0644638 | 1/1979 | U.S.S.R. | 33/1 M |
| 684282 | 9/1979 | U.S.S.R. . | |
| 913019 | 3/1982 | U.S.S.R. . | |
| 947616 | 7/1982 | U.S.S.R. . | |
| 1056108 | 1/1967 | United Kingdom . | |
| 1186031 | 4/1970 | United Kingdom . | |
| 1541731 | 3/1979 | United Kingdom . | |
| 2166266 | 4/1986 | United Kingdom . | |

*Primary Examiner*—Bentsu Ro
*Attorney, Agent, or Firm*—Oliff & Berridge

[57] ABSTRACT

A three-coordinate measuring machine has a probe (22) connected to an output member (11). A driving system (10) is made up of three carriages (15, 17, 19) on guide rails (14, 16, 18). In parallel with this, there is provided a driven system (20) made up of three carriages (25, 27, 29) on guide rails (24, 26, 28). The carriages 19, 29 are connected together via the output member (11). The other pairs of carriages (15, 25 and (17, 27) are linked via respective devices (55). The devices (55) each apply a force between the respective carriages in dependence on acceleration or deceleration of the carriages of the driving system (10). This compensates for dynamic deflections of the guide rails of the driven system (20) which would otherwise be caused by the accelerations. Measuring devices such as scales and readheads are provided on the driven system (20) to determine the position of the probe (22).

17 Claims, 4 Drawing Sheets

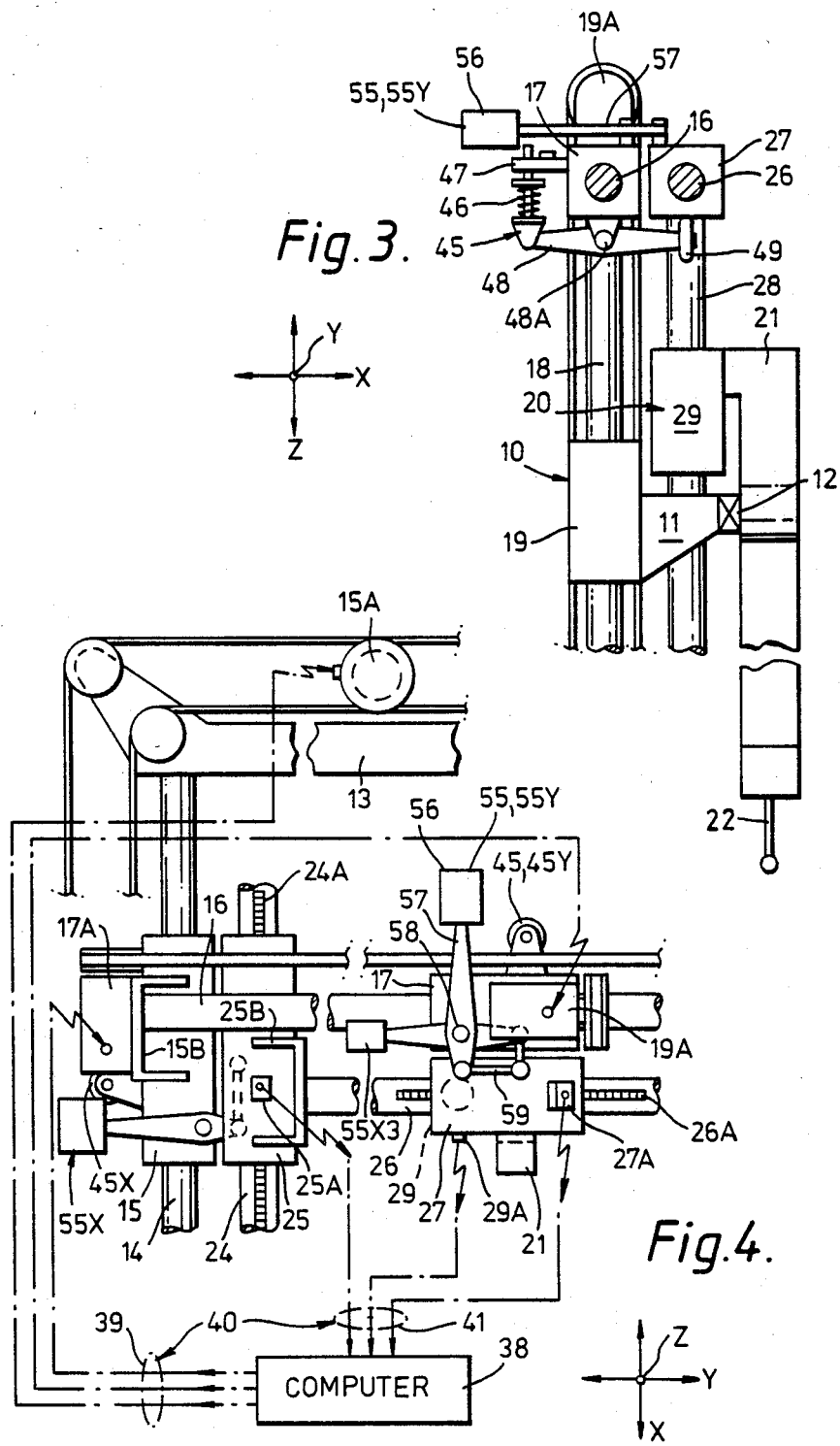

COORDINATE POSITIONING APPARATUS

BACKGROUND OF THE INVENTION

This invention relates to coordinate positioning apparatus. A typical application of the invention is in three-dimensional measuring machines i.e. in coordinate positioning apparatus adapted for determining the spatial measurement, in three dimensions, of workpieces or other objects.

In such machines, the taking of a measurement involves moving a tool such as a surface-sensing probe into sensing relationship, e.g. into physical engagement, with a surface the position of which is to be determined. Readings of the position in space of the movable parts of the machine relative to the fixed parts are then taken, e.g. from measuring devices such as scales. There are machines where the probe is moved automatically, at desirably high speeds, from one surface to the next of a workpiece to be measured. At each surface the probe has to be decelerated when approaching the surface and accelerated when being withdrawn from the surface to be moved to the next surface. The economy of measuring complex workpieces depends on the speed at which the machine can be operated.

However, in conventional measuring machines the movable components, especially the movable bridges found in such machines, are relatively massive because of the need for stability of measurement. Less massive components would tend to be less stiff, and would suffer dynamic deflections when accelerated and decelerated. Such components require large forces for acceleration and heavy foundations to provide reaction. Therefore, such machines are intrinsically not suitable for high speed operation; there is a conflict between speed and stability of measurement.

SUMMARY OF THE INVENTION

One aspect of the present invention provides coordinate positioning apparatus for positioning a tool comprising:
an output member connected to said tool;
a driving system, including at least one first, drivable carriage; guide means for guiding said first carriage in a first direction; and a first elongate element connected to said output member and extending from the first carriage in a second direction substantially perpendicular to the first direction;
a driven system, including at least one second, driven carriage; guide means for guiding said second carriage in the first direction; and a second elongate element connected to said output member and extending from the second carriage in the second direction;
said tool being subject to positional inaccuracy caused by bending deflection of a said elongate element upon acceleration or deceleration of a said carriage;
the apparatus further comprising means for applying a force between the first and second carriages, in dependence on said acceleration or deceleration, in a sense to reduce said positional inaccuracy.

A second aspect of the present invention provides coordinate positioning apparatus for positioning a tool, comprising:
an output member connected to said tool;
a driving system, including at least one first, drivable carriage; guide means for guiding said first carriage in a first direction; and a first elongate element connected to said output member and extending from the first carriage in a second direction substantially perpendicular to the first direction;
a driven system, including at least one second, driven carriage; guide means for guiding said second carriage in the first direction; and a second elongate element connected to said output member and extending from the second carriage in the second direction; and
closed loop means having driving signal means for driving the first carriage; measuring means for measuring the displacement of the second carriage thereby produced; and feedback signal means for feeding the displacement thus measured back to the driving signal means.

As an example of the present invention, a coordinate measuring machine will now be described with reference to the accompanying drawings wherein:

BRIEF DESCRIPTION OF THE DRAWINGS

FIG. 3 is an enlarged section on the line III—III in FIG. 1 and shows additional detail.

FIG. 4 is a partial and enlarged view of FIG. 2 and shows additional detail.

DETAILED DESCRIPTION OF THE PREFERRED EMBODIMENTS

Figure 1:
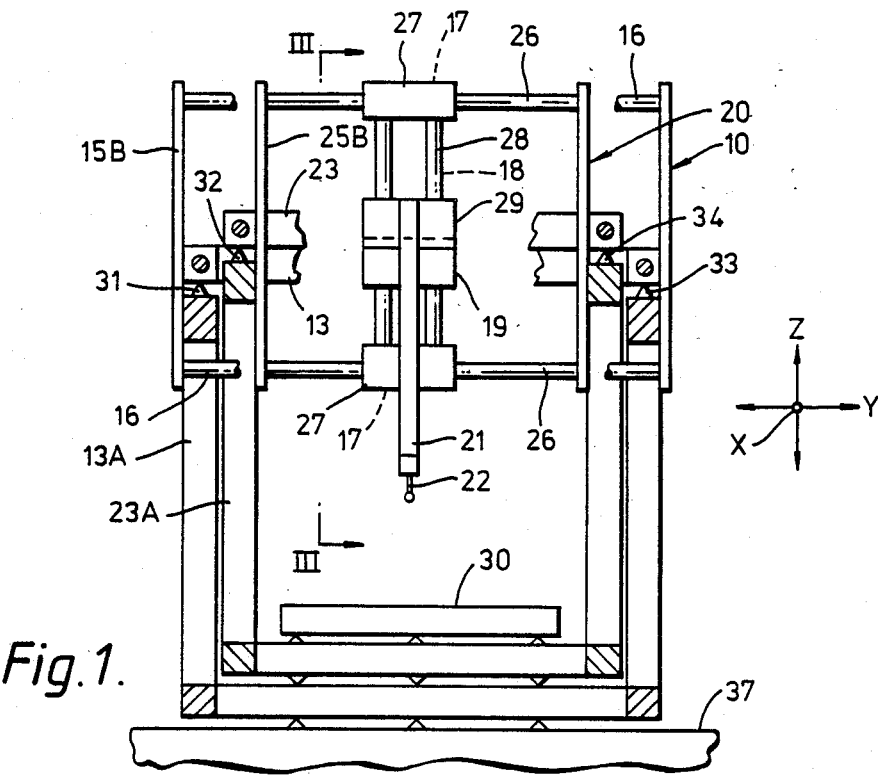
FIG. 1 is a partly sectioned front elevation of the machine showing a driving and a driven system in operational relationship.
Figure 2:
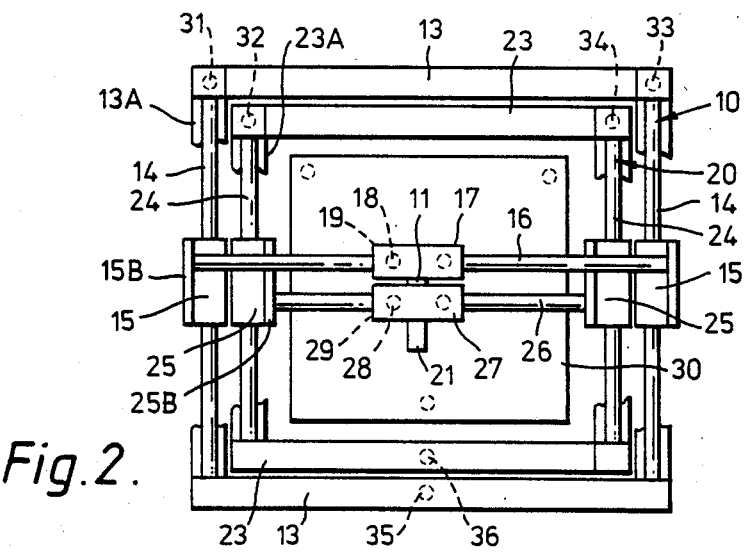
FIG. 2 is a plan view of FIG. 1.
Figure 5:
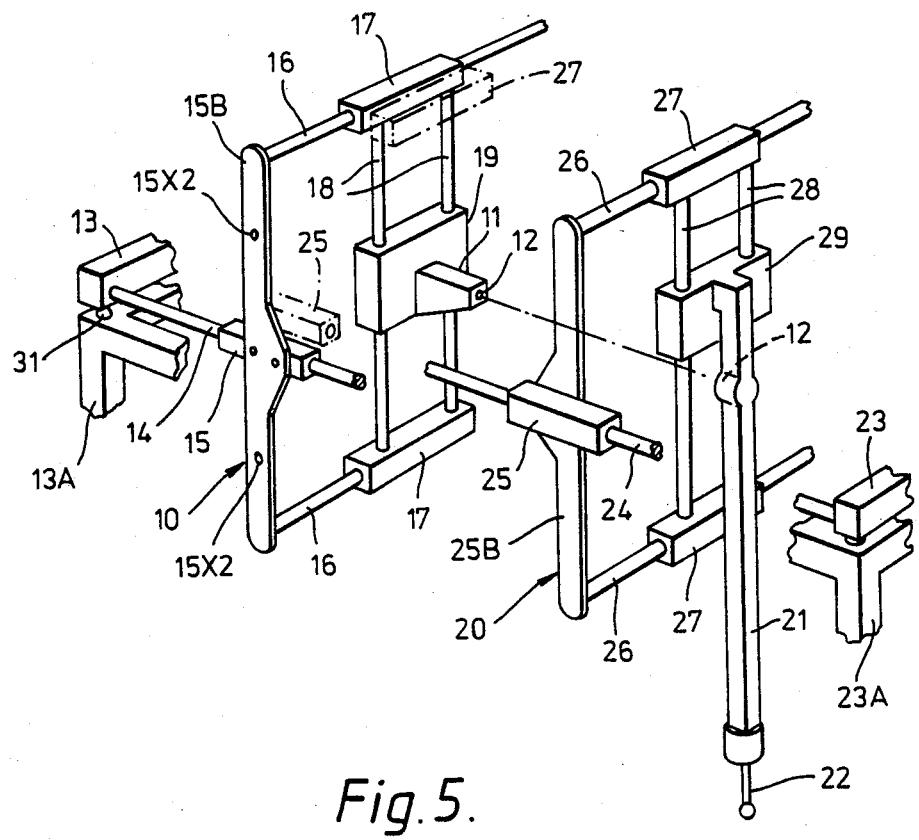
FIG. 5 is a perspective view of parts of the machine shown in FIGS. 1 and 2 but, for clarity, the driving and driven systems are shown in exploded relationship.

Referring primarily to FIGS. 1, 2 and 5, a driving coordinate system 10 supports an output member 11 for three-dimensional displacement relative to a base 30. The member 11 is connected by a universal joint 12 (FIG. 5) to an input member 21 of a driven coordinate system 20 which supports a contact-sensing probe 22 for three dimensional displacement relative to the base 30. The coordinate directions of this displacement are denoted X, Y and Z.

In use of the machine, the driving system 10 drives the probe into a sensing relationship with the surface of a workpiece placed on the base 30. The probe then triggers the taking of X,Y,Z coordinate readings from measuring devices, which as described later are located on the driven system 20.

The driving system 10 has a pair of frame members 13 supported at three points 31,33,35 (FIG. 2) on a frame 13A upstanding from a ground surface 37. The members 13 have secured thereto a pair of horizontal tracks 14 each supporting a carriage 15. A pair of horizontal tracks 16, secured to the carriages 15 by arms 15B, support a pair of carriages 17 to which are secured a pair of vertical tracks 18 supporting a carriage 19 to which the output member 11 is secured. The tracks 14,16,18 ar linear and are mutually perpendicular thereby providing support for said three-dimensional displacement of the member 11. The carriages 15,17,19 are driven along their respective tracks by respective motors 15A,17A,19A (FIG. 4), controlled by a computer 38 programmed to drive the motors to position the output member 11 in accordance with respective drive signals 39 of a closed control loop 40. Since the individual movements of the carriages 15,17,19 along their respective tracks are component movements which are combined to produce the movement of the member 11, the system 10 may be referred to as a component combiner.

The driven system 20 has a pair of frame members 23 supported at three points 32,34,36 (FIG. 2) on the frame 23A supported on the frame 13A and itself supporting the base 30 (FIG. 1). The members 23 have secured thereto a pair of horizontal tracks 24 each supporting a carriage 25. A pair of horizontal tracks 26, secured to the carriages 25 by arms 25B, support a pair of carriages 27 to which are secured a pair of vertical tracks 28 supporting a carriage 29 to which the input member 21 is secured. The tracks 24,26,28 are linear and are mutually perpendicular, and the system 20 constitutes a three-dimensional component resolver for any displacement of the member 21, since it resolves any such displacement into an X-component (along tracks 24), a Y-component (along tracks 26) and a Z-component (along tracks 28).

The system 20 includes three opto-electronic measuring devices, from which the X,Y,Z coordinate readings are taken by the computer 38 when triggered by the probe 22. The measuring devices include measuring heads, 25A,27A,29A (FIG. 4) for measuring the displacement of the respective carriages 25,27,29 along their respective tracks. The tracks 24 and 26 are provided with scales 24A,26A which are read by the respective measuring heads 25A,27A for this purpose, and the track 28 similarly has a scale (not shown) which is read by the measuring head 29A. Other types of measuring devices can be used if desired. Each measuring head has a respective output signal 41 connected to the computer 38 and forming part of the closed control loop 40 to provide feedback for positioning the respective motors 15A,17A,19A. In other words, whereas the system 10 is driven by the drive signals 39, feedback is provided by the signals 41 from the system 20. The drive signals 39 thus provide error signals of the closed control loop 40.

It will be clear that there is at least one track 14 of the system 10 parallel and proximate to a corresponding track 24 of the system 20 and the two systems have two corresponding carriages 15,25. The same description applies to the tracks 16,26 and the carriages 17,27 as well as to the tracks 18,28 and the carriages 19,29. This arrangement makes it possible for both systems 10,20 to be constructed of relatively light components essentially because deflection of the system 10 is not sensed by the measuring devices which, as mentioned, are provided on the system 20. For the purpose of control stability, measuring devices corresponding to the devices 25A,27A,29A may also be provided in the system 10 to provide a "secondary" position feedback. The system 10 may also include a velocity control loop in respect of the movement of the carriages 15,17,19.

The potential for light construction is exploited especially well by the introduction of compensating devices now to be described.

The systems 10,20 are connected by two gravity-compensating devices 45 (FIGS. 3,4) intended to support the tracks 24,26 against the deflection under gravitational force. Further, the systems 10,20 are connected by two inertia-compensating devices 55 intended to provide compensation in respect of dynamic deflection of the arms 25B and the tracks 26,28 due to inertia in the system 20 when a force is applied thereto at the input member 21. The devices 45,55 will be described in detail.

FIG. 4 shows the two devices 45 denoted respectively 45X,45Y. The device 45Y is shown more specifically in FIG. 3 and comprises a compression spring 46, connected between an adjuster 47 provided on the carriage 17 and one end of a lever 48 connected by a pivot 48A to the carriage 17, the other end of the lever being provided with a roller bearing 49 on the underside of the adjacent carriage 27. The arrangement is such that the spring 46 supports the tracks 26 against deflection under its weight and the weight of the carriage 27, the tracks 28, the carriage 29, the member 21 and the probe 22. As a result, the forces which would cause deflection of the track 26 are reacted in the track 16 and the track 26 remains linear at the expense of deflection in the track 16. FIG. 3 shows the device 45 as provided between the corresponding carriages 17,27 at the top end of the tracks 18,28. An equivalent device 45 may be provided between the corresponding carriages 17,27 at the bottom end of the tracks 18,28.

The device 45X (FIG. 4) is provided between the carriages 15,25 and is contructed in the same way as the device 45Y. It will be understood that there is one device 45 between each pair of the corresponding carriages 15,25.

Further FIG. 4 shows the two devices 55, denoted respectively 55X,55Y. The device 55Y comprises a mass 56 secured to one end of a double-ended lever 57 connected to the carriage 17 by a pivot 58. The other end of the lever 57 is connected to the carriage 27 by a pivot link 59. It will be clear that any acceleration of the carriage 17 in the direction of the track 16 has to act through the tracks 18,28 and any consequent deflection of the tracks 18,28 results in the carriage 27 lagging behind the carriage 17 until acceleration ceases. The device 55Y compensates for such lagging inasmuch as the inertia of the mass 56, acting through the lever 57 and the link 59, applies to the carriage 27 a force in the direction of the acceleration of the carriage 17 so that the carriage 27 substantially moves together with the carriage 17 notwithstanding deflection of the tracks 18,28. The mass of the mass 56 and the length of the lever 57 are selected (relative to the stiffness and lengths of the tracks 18,28 and the masses of the system components) to achieve this. The mass 56 effectively comprises a means for sensing acceleration combined with a means for generating a force proportional to the acceleration sensed. The force has to be reacted by the arms 15B and tracks 18. Deflection of the latter arms and tracks under said reaction reduces the force, but the effect of this is negligible provided that the stiffness of the arms 15B and tracks 18 is reasonably high compared to the masses to be accelerated and given that the carriages are supported on their tracks by virtually frictionless air bearings.

A second said device 55, denoted 55X, is similar to the device 55Y but is arranged to act between the carriages 15,25 in the direction of the tracks 14 so that acceleration of the carriage 25 in the latter direction is compensated for in respect of deflection of the tracks 16,18,26,28 in that direction.

In as much as the devices 55 are intended to remove inertia forces on the system 20, these devices may also be regarded as intended to eliminate dynamic loads between the carriages and their respective tracks transverse to the length of the track, caused by acceleration and deceleration of the systems. So, for example, when the carriage 15 is accelerated in the X-direction, the force then acting on the joint 12 in the X-direction causes transverse loads on the carriages 29 and 27. In as much as these forces are due to the inertia of the carriage 25, the acceleration of the carriage 25 by the device 55X eliminates these transverse forces from the carriages 27,29. However, consideration may be given to the other inertial masses and to the compliance of any of the members of the system 20. Firstly, there are the arms 25B each of which is both an inertial mass and, to some extent at least, a compliant member. Both these aspects can be dealt with by providing, instead of the device 55X, two such devices (not shown) each connected between the arms 15B,25B in positions 15X2 (FIG. 5) respectively above and below the carriage 25. More specifically, said two devices have positions intermediate between the carriage 25 and the respective tracks 26 so selected that, while the arm itself can bend, the relative position of the carriage 25 and the ends of the tracks 16 remain unchanged.

Further, consideration may be given to deflection of the tracks 16 in the X-direction due to inertia of the carriages 27,29 and their associated tracks 26,28 in that direction. The latter inertia can be compensated for by a device 55X3 (FIG. 4) provided between the carriages of each carriage pair 17,27 but arranged to act in the X-direction so that inertia forces acting in that direction are equalized or, in other words, transverse loads on the carriages 27 are eliminated.

Figure 6:
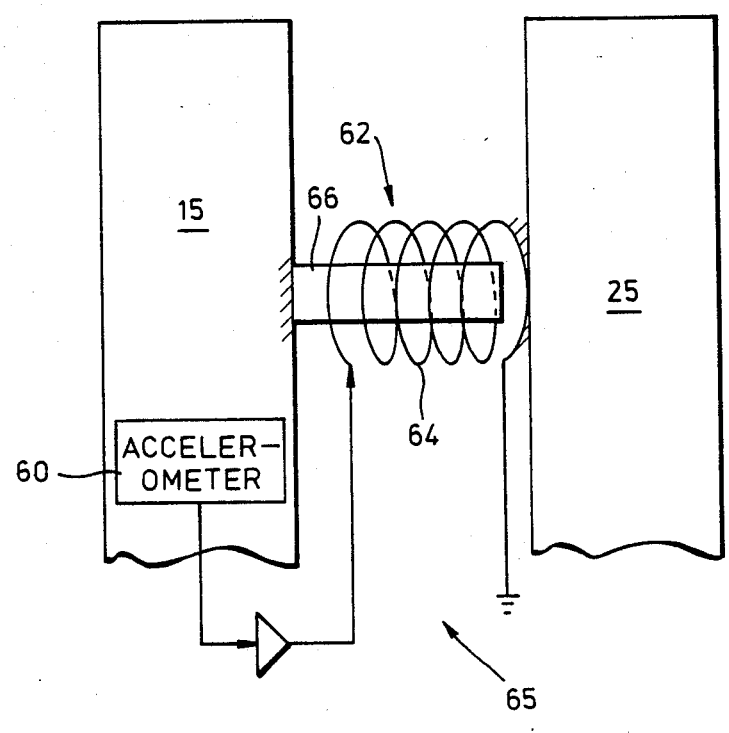
FIG. 6 shows part of a modified machine.

In a modification illustrated in FIG. 6, and referring by way of example to the carriages 15,25, the device 55 is replaced by a device 65 comprising an accelerometer 60 mounted on the driving carriage 15, and a linear motor 62 provided between the carriages 15,25. The linear motor comprises a coil 64 secured to one of the carriages 15,25 and a core 66 secured to the other one of these carriages. The accelerometer 60 is adapted to produce an output signal proportional to acceleration of the driving carriage 15. An amplifier 64 is provided for amplifying said output signal and the output of the amplifier is connected to the linear motor 62, the latter being adapted to produce between the carriages 15,25 a force proportional to said acceleration.

The accelerometer 60 could be mounted on the driven carriage 25 instead of the driving carriage 15. Indeed, this may well be preferable: we wish to reduce or eliminate dynamic deflections of the driven system in which the measuring devices are provided, and the accelerations of the driven carriage are more directly related to these. It will be clear that such accelerometer and linear motor devices can be provided between the carriages 17,27 or wherever appropriate between the driving and driven systems 10,20.

The invention is not restricted to bridge-type coordinate measuring machines such as exemplified above, but can be used in any machine in which a probe or other tool is to be positioned at a given coordinate location. For example, it can be used in a coordinate measuring machine of the type in which a probe is mounted on a cantilever arm. In this case there would be a driving system and a driven system each comprising a cantilever arm.

We claim:

1. Coordinate positioning apparatus for positioning a tool, comprising:
    an output member connected to said tool;
    a driving system, including at least one first, drivable carriage; guide means for guiding said first carriage in a first direction; and a first elongate element connected to said output member and extending from the first carriage in a second direction substantially perpendicular to the first direction;
    a driven system, including at least one second, driven carriage; guide means for guiding said second carriage in the first direction; and a second elongate element connected to said output member and extending from the second carriage in the second direction;
    said tool being subject to positional inaccuracy caused by bending deflection of one of said elongate elements upon acceleration or deceleration of one of said carriages;
    the apparatus further comprising accelerationresponsive means for applying a force between the driving system and the driven system, in dependence on said acceleration or deceleration, to reduce said positional inaccuracy.

2. Coordinate positioning apparatus according to claim 1,
    wherein the driving system includes a further, drivable carriage, guided for movement generally perpendicular to said first, drivable carriage, and forms a component combiner for combining mutually perpendicular displacements of the drivable carriages into resultant displacement of the output member,
    and wherein the driven system includes a further driven carriage, guided for movement generally perpendicular to said second, driven carriage, and forms a component resolver for resolving the displacement of the output member into respective displacements of the driven carriages.

3. Coordinate positioning apparatus according to claim 2, wherein the first elongate element forms a guide means for said movement of the further drivable carriage, and wherein the second elongate element forms a guide means for said movement of the further driven carriage.

4. Coordinate positioning apparatus according to claim 2 wherein said acceleration-responsive means comprises at least two acceleration-responsive devices for applying a force in dependence on acceleration or deceleration, one of said devices acting between the first, drivable carriage and the second, driven carriage, and another of said devices acting between the further drivable carriage and the further driven carriage.

5. Coordinate positioning apparatus according to claim 1, wherein said acceleration-responsive means for applying a force in dependence on acceleration or deceleration comprises a lever pivoted between the driving system and the driven system, the lever being provided with a mass the inertia of which provides the force in dependence on acceleration or deceleration.

6. Coordinate positioning apparatus according to claim 1, wherein said acceleration-responsive means for applying a force in dependnece on acceleration or deceleration comprises an accelerometer mounted to measure said acceleration or deceleration, and a linear motor provided between the driving system and the driven system, the accelerometer having an output signal which controls the linear motor to produce said force in dependence on acceleration or deceleration.

7. Coordinate positioning apparatus according to claim 1, including gravity-compensating means for supporting at least one of said guide means against deflection under gravitational force.

8. Coordinate positioning apparatus according to claim 1, including measuring means for measuring the displacement of the second carriage.

9. Coordinate positioning apparatus for positioning a tool, comprising:
an output member connected to said tool;
a driving system, including at least one first, drivable carriage; guide means for guiding said first carriage in a first direction; and a first elongate element connected to said output member and extending from the first carriage in a second direction substantially perpendicular to the first direction;
a driven system, including at least one second, driven carriage separate from said first carriage; guide means for guiding said second carriage in the first direction; and a second elongate element connected to said output member and extending from the second carriage in the second direction; and
closed loop means having driving signal means for driving the first carriage along its guide means in said first direction; measuring means for measuring the displacement of the second carriage thereby produced; and feedback signal means for feeding the displacement thus measured back to the driving signal means.

10. Coordinate positioning apparatus according to claim 9,
wherein the driving system includes a further, drivable carriage, guided for movement generally perpendicular to said first drivable carriage, and forms a component combiner for combining mutually perpendicular displacements of the drivable carriages into resultant displacement of the output member,
and wherein the driven system includes a further, driven carriage guided for movement generally perpendicular to said second, driven carriage, and forms a component resolver for resolving the displacement of the output member into respective displacements of the driven carriages.

11. Coordinate positioning apparatus according to claim 9,
said tool being subject to positional inaccuracy caused by bending deflection of one of said elongate elements upon acceleration or deceleration of one of said carriages;
the apparatus further comprising accelerationresponsive means for applying a force between the driving system and the driven system, in dependence on said acceleration or deceleration, to reduce said positional inaccuracy.

12. Coordinate positioning apparatus for positioning a tool comprising
a component combiner adapted to combine respective displacement of a first and a second driving member into resultant displacement of an output member;
a component resolver having an input member connected to said output member and adapted to resolve the displacement of said output member into respective displacements of a first and a second driven member;
said tool being mounted on one of said output and input members;
first closed loop means having driving signal means adapted to drive said first and second driving member and feedback signal means identifying the displacement of said first and second driven member respectively.

13. Apparatus according to claim 12 comprising means for determining acceleration of at least one of said driving members, and means connected between said one of the driving members and an adjacent corresponding one of said driven members for applying to the driven member a force being a function of said acceleration.

14. Coordinate positioning apparatus for positioning a tool, comprising;
a first positioning system, including at least a first movable carriage; guide means for guiding said first movable carriage in a first direction; and a first elongate element connected between said tool and said first movable carriage, the first elongate element extending in a second direction generally perpendicular to the first direction and being subject to bending deflection upon acceleration or deceleration of said first movable carriage, such deflection tending to cause positional inaccuracy of said tool; and
acceleration-responsive means for applying a force to the first positioning system, in dependence on said acceleration or deceleration, said force acting to reduce said positional inaccuracy.

15. Coordinate positioning apparatus according to claim 14, wherein the first positioning system includes a further movable carriage, guided for movement in the second direction by said first elongate element, said tool being connected to said first elongate element via said further carriage, and wherein the acceleration-responsive means is connected to said further carriage so that said force is applied to said further carriage.

16. Coordinate positioning apparatus according to claim 14, further comprising a second positioning system, including a second elongate element which extends generally in the second direction, generally parallel to the first elongate element, and which is guided for movement in the first direction, and wherein said acceleration-responsive means applies said force between the first positioning system and the second positioning system.

17. Coordinate positioning apparatus according to claim 16, wherein the first and second positioning systems each include a respective further movable carriage, said further carriages being guided for movement in the second direction by the first and second elongate elements respectively, said tool being connected to at least one of said further carriages, and wherein the acceleration-responsive means is connected between said further carriages so that said force is applied between said further carriages.

* * * * *